US008793132B2

(12) United States Patent
Itoh et al.

(10) Patent No.: US 8,793,132 B2
(45) Date of Patent: Jul. 29, 2014

(54) METHOD FOR SEGMENTING UTTERANCES BY USING PARTNER'S RESPONSE

(75) Inventors: Nobuyasu Itoh, Yokohama (JP); Gakuto Kurata, Yamato (JP)

(73) Assignee: Nuance Communications, Inc., Burlington, MA (US)

( * ) Notice: Subject to any disclaimer, the term of this patent is extended or adjusted under 35 U.S.C. 154(b) by 1737 days.

(21) Appl. No.: 11/964,051

(22) Filed: Dec. 26, 2007

(65) Prior Publication Data

US 2008/0154594 A1   Jun. 26, 2008

(30) Foreign Application Priority Data

Dec. 26, 2006  (JP) ................. 2006-350508

(51) Int. Cl.
*G10L 15/00* (2013.01)
*G10L 15/04* (2013.01)

(52) U.S. Cl.
USPC .... 704/253; 704/248; 704/251; 704/E19.005; 704/E19.003

(58) Field of Classification Search
CPC .............................. G10L 15/22; G10L 15/222
USPC ........... 704/253, 248, E19.005, E19.003, 251
See application file for complete search history.

(56) References Cited

U.S. PATENT DOCUMENTS 5,357,596 A * 10/1994 Takebayashi et al. ........ 704/275
5,761,637 A *  6/1998 Chino ............................ 704/231
5,806,021 A *  9/1998 Chen et al. ........................ 704/9
6,496,799 B1 * 12/2002 Pickering ...................... 704/235
6,694,055 B2 *  2/2004 Wu ................................ 382/185
6,839,670 B1 *  1/2005 Stammler et al. ............. 704/251
6,873,953 B1 *  3/2005 Lennig .......................... 704/253

(Continued)

FOREIGN PATENT DOCUMENTS

CN    1573925 A    2/2005
CN    1731804 A    2/2006
JP    2001-272990  10/2001
JP    2006-276754  12/2006  ............ G10L 15/22

OTHER PUBLICATIONS

Andreas Stolcke et al.: "Automatic Linguistic Segmentation of Conversational Speech," Proceedings of the International Conference on Spoken Language Processing, vol. 2, Philadelphia 1996; pp. 1005-1008.*

(Continued)

*Primary Examiner* — Pierre-Louis Desir
*Assistant Examiner* — Abdelali Serrou
(74) *Attorney, Agent, or Firm* — Wolf, Greenfield & Sacks, P.C.

(57) ABSTRACT

An apparatus, method and program for dividing a conversational dialog into utterance. The apparatus includes: a computer processor; a word database for storing spellings and pronunciations of words; a grammar database for storing syntactic rules on words; a pause detecting section which detects a pause location in a channel making a main speech among conversational dialogs inputted in at least two channels; an acknowledgement detecting section which detects an acknowledgement location in a channel not making the main speech; a boundary-candidate extracting section which extracts boundary candidates in the main speech, by extracting pauses existing within a predetermined range before and after a base point that is the acknowledgement location; and a recognizing unit which outputs a word string of the main speech segmented by one of the extracted boundary candidates after dividing the segmented speech into optimal utterance in reference to the word database and grammar database.

13 Claims, 5 Drawing Sheets

(56) References Cited

U.S. PATENT DOCUMENTS

| | | | |
|---|---|---|---|
| 6,876,967 B2* | 4/2005 | Goto et al. | 704/254 |
| 6,885,987 B2* | 4/2005 | Buchholz et al. | 704/228 |
| 7,076,430 B1* | 7/2006 | Cosatto et al. | 704/275 |
| 7,177,810 B2* | 2/2007 | Shriberg et al. | 704/253 |
| 7,313,526 B2* | 12/2007 | Roth et al. | 704/270 |
| 7,373,300 B1* | 5/2008 | Bangalore et al. | 704/270.1 |
| 7,493,251 B2* | 2/2009 | Gao et al. | 704/8 |
| 7,493,257 B2* | 2/2009 | Kim et al. | 704/240 |
| 7,567,902 B2* | 7/2009 | Davis et al. | 704/251 |
| 7,756,709 B2* | 7/2010 | Gierach | 704/253 |
| 7,801,838 B2* | 9/2010 | Colbath et al. | 706/20 |
| 7,818,174 B1* | 10/2010 | Resnick et al. | 704/257 |
| 8,165,880 B2* | 4/2012 | Hetherington et al. | 704/253 |
| 2002/0032564 A1* | 3/2002 | Ehsani et al. | 704/235 |
| 2002/0184373 A1* | 12/2002 | Maes | 709/228 |
| 2003/0004730 A1* | 1/2003 | Yuschik | 704/275 |
| 2003/0163309 A1* | 8/2003 | Yamada et al. | 704/231 |
| 2004/0193400 A1* | 9/2004 | McDonald | 704/9 |
| 2004/0199375 A1* | 10/2004 | Ehsani et al. | 704/4 |
| 2005/0027523 A1* | 2/2005 | Tarlton et al. | 704/234 |
| 2005/0216264 A1* | 9/2005 | Attwater et al. | 704/239 |
| 2006/0287847 A1* | 12/2006 | Moore | 704/8 |
| 2007/0067172 A1* | 3/2007 | Lee et al. | 704/257 |
| 2007/0071206 A1* | 3/2007 | Gainsboro et al. | 379/168 |
| 2007/0203709 A1* | 8/2007 | Yasutaka | 704/275 |
| 2008/0215325 A1* | 9/2008 | Horii et al. | 704/251 |

OTHER PUBLICATIONS

"Sentence Boundary Detection in Broadcast Speech Transcripts," Proceedings of the International Speech Communication Association Workshop: Automatic Speech Recognition: Challenges for the New Millennium, Paris, Sep. 2000; 8 pages.*

Office Action mailed Jan. 18, 2011 in Japanese Patent Application No. 2006-350508.

* cited by examiner

DEWA CHUMON FUKUSHO SASETE ITADAKIMASU. MACHIGAIGA NAIKA GOISSHONI
KAUKNIN WO ONEGAI ITASHIMASU  ←*FIXED PHASE FOR STARTING CONFIRMATION*

SEGMENT 1 : ???[rejected]
SEGMENT 2 : ???[rejected]
SEGMENT 3 : IT DREAM FAND      ←*RECOGNITION FAILURE*
SEGMENT 4 : KAWASE HEJJI ARINO TAIPU
SEGMENT 5 : DORU KOKUSAI       ←*RECOGNITION FAILURE*
SEGMENT 6 : ???[rejected]
HAI, DEWA NYURYOKU ITASHIMASHITA.  ←*FIXED PHASE FOR ENDING CONFIRMATION*

[Rejected] INDICATES REJECTION DUE TO LOW RELIABILITY OF RECOGNITION RESULT

─ 420

DEWA CHUMON FUKUSHO SASETE ITADAKIMASU. MACHIGAIGA NAIKA GOISSHONI
KAUKNIN WO ONEGAI ITASHIMASU  ←*FIXED PHASE FOR STARTING CONFIRMATION*

SEGMENT 1 : HAI KOCHIRA HONJITU KAITSUKEDE
SEGMENT 2 : SHOUHIN CODO 793 NO IBM GUROBARU FANDO
SEGMENT 3 : KUCHISUU GA 10
SEGMENT 4 : KAWASE HEJJI ARI NO TAIPU
SEGMENT 5 : 57,000 ENDE
SEGMENT 6 : SHUEKI WA SAITOUSHI GATA
SEGMENT 7 : GAISANKINGAKU WA 57 MANEN GURAINI NARIMASUGA YOROSHIIDE SHOKA
HAI, DEWA NYURYOKU ITASHIMASHITA.  ←*FIXED PHASE FOR ENDING CONFIRMATION*

METHOD FOR SEGMENTING UTTERANCES BY USING PARTNER'S RESPONSE

CROSS-REFERENCE TO RELATED APPLICATIONS

This application claims priority under 35 U.S.C. §119 to Japanese Patent Application No. 2006-350508 filed Dec. 26, 2006, the entire text of which is specifically incorporated by reference herein.

BACKGROUND OF THE INVENTION

The present invention relates to a method for dividing speech. In particular, the present invention relates to a method for dividing speech by use of acknowledgement responses.

In a transcription process on telephone conversation contents in an operator-service support system and the like, a speech of an operator and that of a customer are separately recorded and converted into text data. Conventionally, in order to efficiently search a recorded speech, a position where a predetermined keyword such as a product name is spoken is recorded, and the timestamp of the position is used as an index. The transcription process is performed by specifying a position of the keyword with automatic speech recognition and the like, and then by replaying the speech of a corresponding part. However, information on the conversation contents cannot be accurately extracted in such a method, since the method does not effectively use the customer's speech, particularly an acknowledgement. To be specific, it is difficult to accurately recognize and analyze a speech from a voice stream, since the speech is not divided into appropriate utterance.

An example of a conventional technique is disclosed in Japanese Patent Application Laid-open Publication No. 2006-276754.

BRIEF SUMMARY OF THE INVENTION

The present invention has been made in view of the aforementioned technical problems. An object of the present invention is to divide a conversational dialog into speech units, what is called an utterance in linguistics by use of acknowledgement responses (hereinafter, simply called acknowledgements). In addition, another object of the invention is to accurately recognize a speech from a voice stream.

In order to achieve the aforementioned objects, an aspect of the present invention is to provide an apparatus for dividing a conversational dialog into utterance. The apparatus is configured to include: a word database for storing spellings and pronunciations of words; a grammar database for storing syntactic rules on words; a pause detecting section which detects a pause location in a channel taking a turn, that is to say speaker's channel, hereafter a main speech, among conversational dialogs inputted in at least two channels; an acknowledgement detecting section which detects an acknowledgement location in a channel not speaking (listener's channel); a boundary-candidate extracting section which extracts boundary candidates in the main speech, by extracting the pauses existing within a predetermined range before and after a base point that is the acknowledgement location; and a recognizing unit which outputs a word string of the speech segmented by one of the extracted candidates after dividing the segmented speech into optimal utterance in reference to the word database and grammar database.

In addition, the grammar database may include fixed-phrase grammar, acknowledgement grammar and recognition grammar. Moreover, the fixed-phrase grammar may include fixed phrases for starting and ending a confirmation, and the word database may include spellings and pronunciations of the fixed phrases for starting and ending a confirmation. Then, the apparatus may include a recognition-target segment determination unit which determines in advance a recognition target segment to be divided into utterance, by referring to the fixed-phrase grammar.

Another aspect of the present invention is to provide a method for dividing a conversational dialog into utterance by use of conversational dialogs inputted in separated channels, by use of a word database in which spellings and pronunciations of words are described, and by use of a grammar database in which grammar including syntactic rules on words is described. The method includes the steps of: detecting a pause location in a channel making a main speech; detecting an acknowledgement location in a channel not making the main speech; extracting boundary candidates in the main speech by extracting pauses existing within a predetermined range before and after a base point that is the acknowledgement location; and outputting a word string of the speech segmented by one of the extracted boundary candidates, after dividing the segmented speech into optimal utterance in reference to the word database and grammar database.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

DETAILED DESCRIPTION OF THE INVENTION

Figure 1:
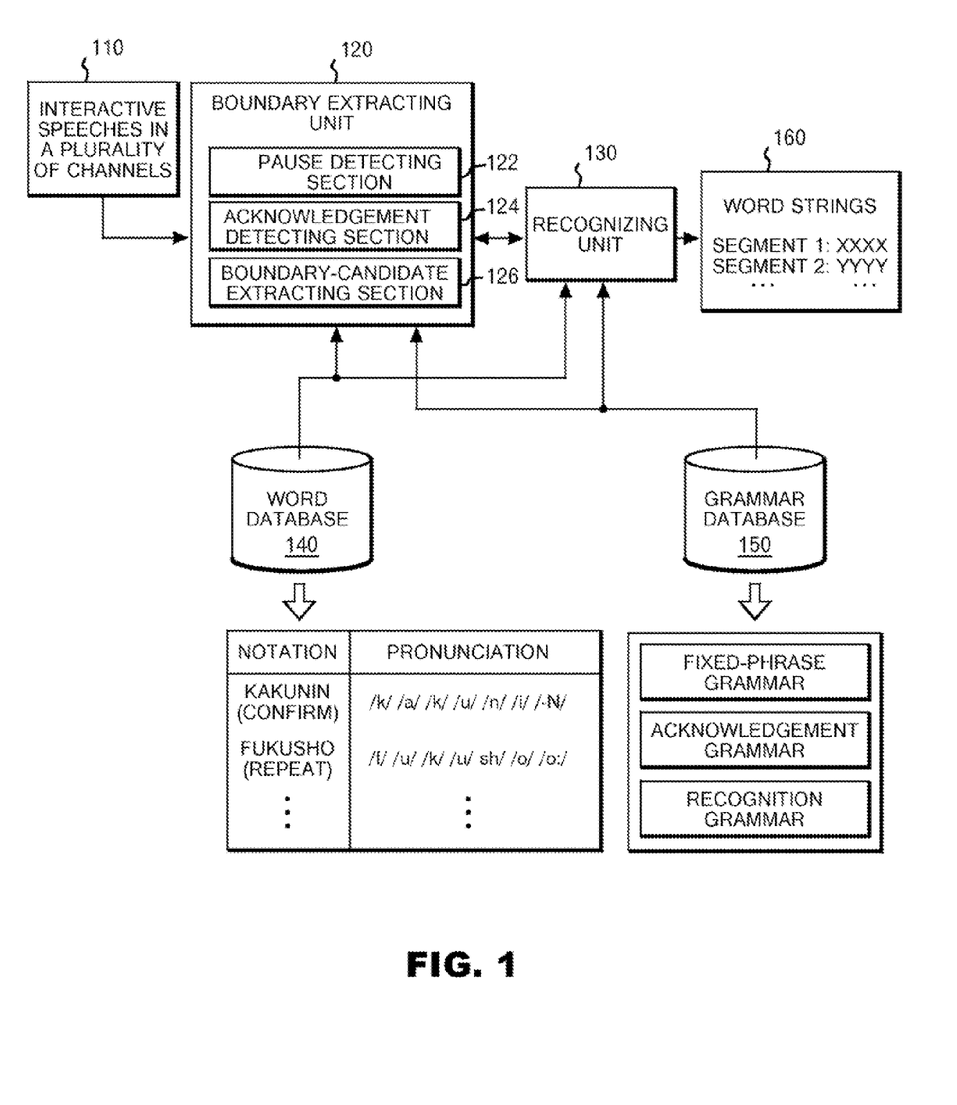
FIG. 1 shows an apparatus for dividing a speech into utterance.

FIG. 1 shows an apparatus of the present invention for dividing a speech voice into utterance. The apparatus is mainly configured of a boundary extracting unit 120 and a recognizing unit 130. The boundary extracting unit 120 is configured of a pause detecting section 122, an acknowledgement detecting section 124 and a boundary-candidate extracting section 126. In executing the processing of the present invention, both the boundary extracting unit 120 and the recognizing unit 130 make reference to a word database 140 and a grammar database 150. Specifically, a spelling and pronunciation of each word is stored in the word database 140, while syntactic rules on words are stored in the grammar database 150. Here, each pronunciation in the word database 140 is written in phonemic units. Each phoneme is preferably written by use of an acoustic model to indicate what statistical property the signal of the phoneme has. By using such acoustic models, a part of conversational dialogs can be identified as which word. Additionally, the grammar database 150 stores fixed-phrase grammar, acknowledgement grammar and recognition grammar therein. Here, the grammar is a rule for judging whether a speech agrees with a fixed pattern.

Examples of the above grammar described in the BNF (Backus-Naur Form) are shown below.

```
    fixed-phrase grammar: <a fixed-phrase from starting
confirmation to ending the phrase>
        = sore? dewa (kakunin/fukushou) sasete itadaki masu.
            |arigatou gozaimasita
        (= now, your order will be confirmed|repeated.
            |thank you)
    acknowledgement grammar: <acknowledgements>
        = hai|ee|soudesu
        (= yes|OK|right)
    recognition grammar: <confirmation of contents>
        = shouhin bangou ga? <NUMBER> no <PRODUCT_NAME>
        (= <PRODUCT_NAME> of the product number <NUMBER>
            |kawase hejji wa? (ari|nasi)
            |exchange hedge? (use|do not use)
            |kuchisu wa <NUMBER> kuchi
            |<NUMBER> units)
        <NUMBER> = (0|1|2|3|4|5|6|7|8|9)+
        <PRODUCT NAME> = IBM gurobaru fando |IT dorimu fando|doru
kokusai|...
        (<PRODUCT NAME>=IBM global fund|IT dream fund|dollar
international|...)
```

Note that an acknowledgement is a response for making a confirmation in response to speech of a conversation partner. Typically, an acknowledgement is a back-channel feedback which is a short response made to a conversation partner with a main speaker unchanged in a conversation. In conventional techniques, such acknowledgements are not positively used in dividing and recognizing speech, but rather are regarded as unnecessary. However, three acknowledgements are registered as examples in the aforementioned acknowledgement grammar, and other acknowledgements can be added as needed to the acknowledgement grammar.

To the boundary extracting unit 120, continuous conversational dialogs 110, that is, voice streams are inputted in a plurality of channels corresponding to the respective speakers. By use of a following method of the present invention, the boundary extracting unit 120 passes, to the recognizing unit 130, voice data of the channel mainly speaking, and boundary candidates for dividing the main speech into utterance. Specifically, a boundary candidate is passed by use of a time of the initial point of the voice stream, regarding the initial point as a base point of the boundary candidate. The recognizing unit 130 makes recognition using the received voice data and the aforementioned boundary candidates by referring to the recognition grammar and to a dictionary, and then outputs a word string 160 which is a recognition result corresponding to a segment obtained by dividing the voice data by dividing positions (strings) recognized as optimal. Further, each of the word strings is, for example, configured of a segment and a recognized content which are expressed as XXXX for segment 1, YYYY for segment 2 and so on. Preferably, the word string 160 is further passed to a sentence comprehending unit or the like in some applications. However, a description of the sentence comprehending unit will be omitted since the processing thereof is independent from the present invention.

Figure 2:
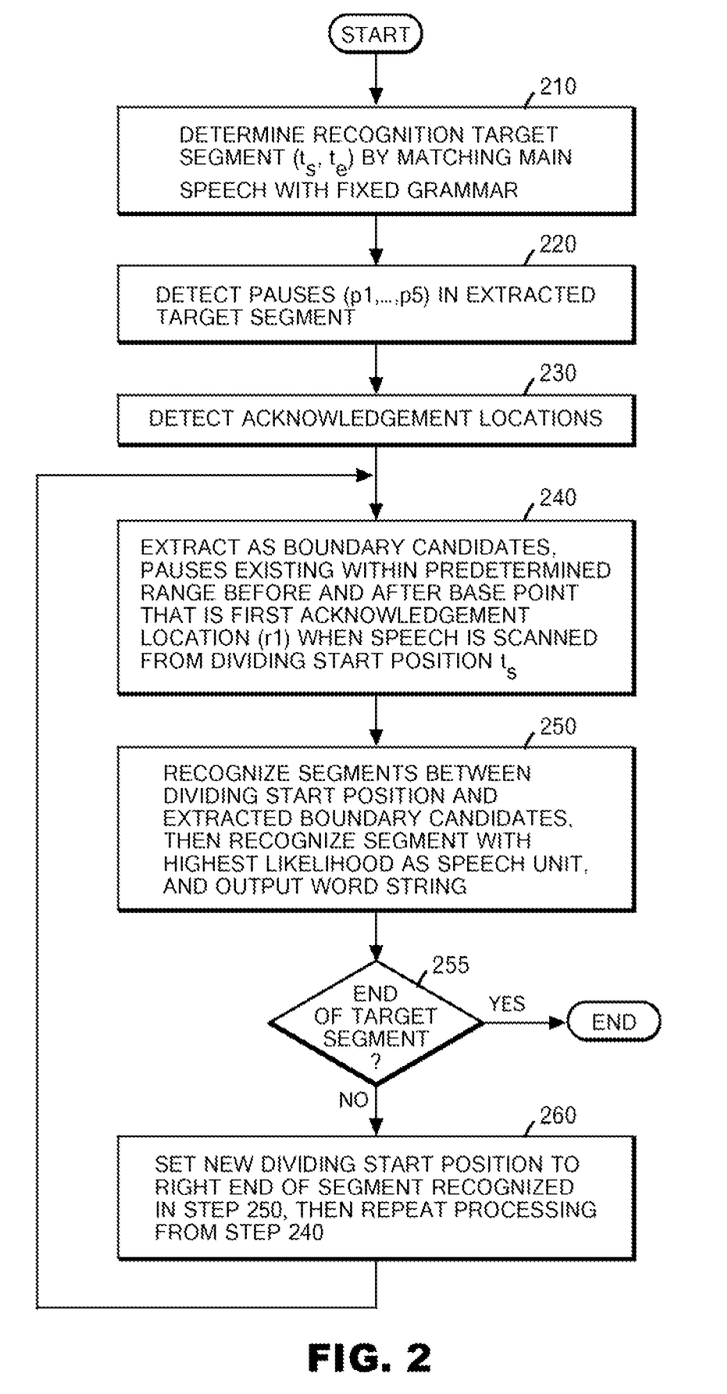
FIG. 2 shows a flowchart of a processing of the present invention.
Figure 3:
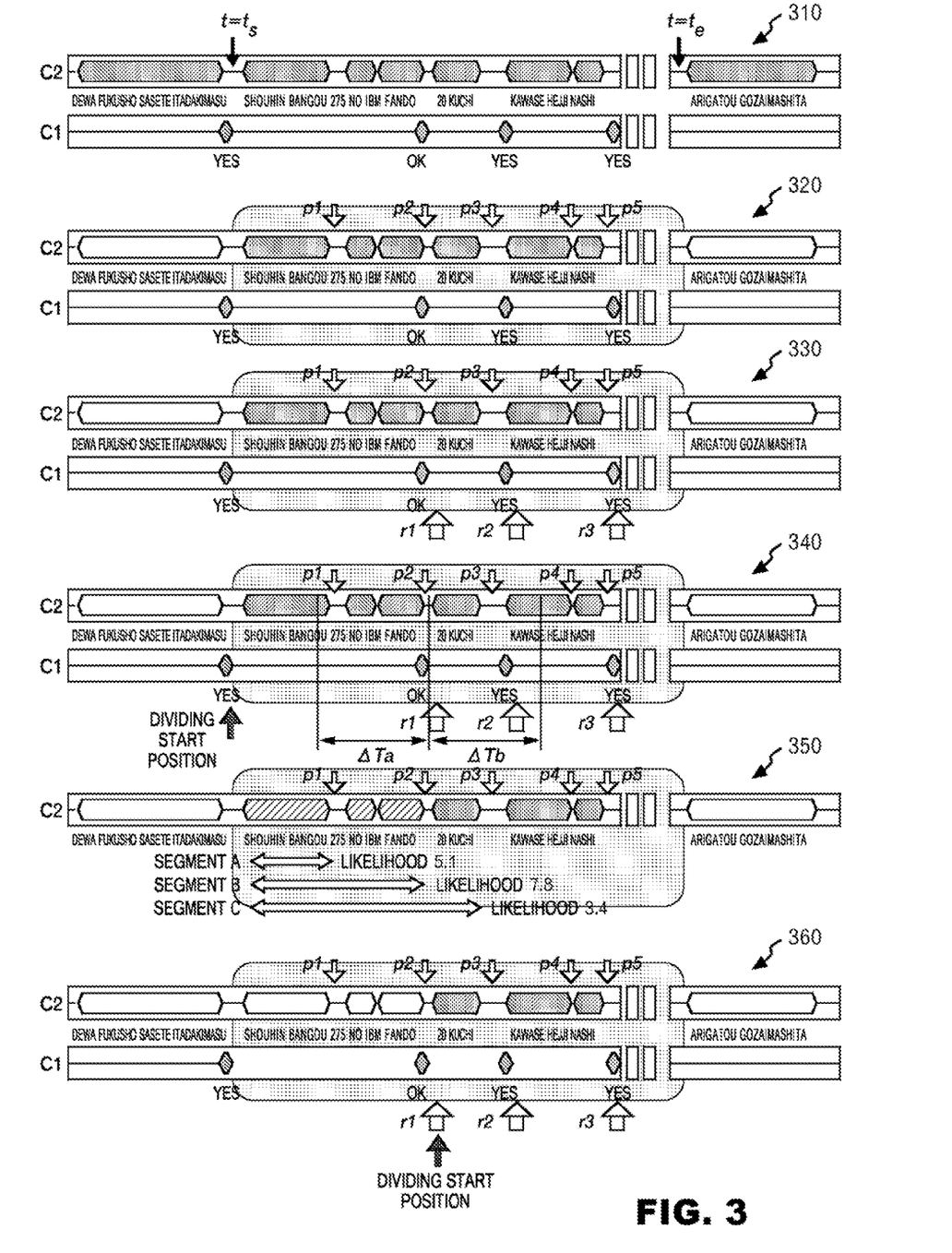
FIG. 3 shows a diagram of specific examples of each processing of the present invention.

Hereinafter, a detailed description on the processing of the present invention will be provided with reference to FIGS. 2 and 3. To be specific, the description is provided for a case of telephone ordering where conversational dialogs of two channels are inputted as voice streams. FIG. 2 shows a flowchart of a process of the present invention, while FIG. 3 shows, by use of voice-waveform data, a more specific process corresponding to each of the steps in FIG. 2. For the sake of simplicity, the voice-waveform is expressed in trapezoidal shapes connecting the vertexes of the waveform. Here, FIG. 3 describes a case where the main speech is "dewa fukushou sasete itadakimasu. shouhin bangou 275 no IBM fando 20 kuchi, kawase hejji nasi. arigatou gozaimasita. (Now, your order will be repeated. Product code 275, IBM funds, 20 units, without exchange hedge. Thank you.)" Note that in FIG. 3, C1 and C2 indicate channels, where C2 is the voice-waveform of a speaker and C1 is the voice-waveform of a listener who gives acknowledgements while listening to the speech. The object here is to appropriately recognize and comprehend the main speech (speaker's speech) by use of acknowledgements of a channel different from that of the main speech. To this end, the processing is executed by the following steps.

Firstly, in step 210, a time $(t_s, t_e)$ of a speech segment to be recognized is recorded, by matching the speech of the channel corresponding to the main speech, with the fixed-phrase grammar. This processing is equivalent to 310 in FIG. 3. In the fixed-phrase grammar, various fixed phrases each appearing in the beginning or ending of a group of speech are registered. Typical examples of the fixed phrases for confirmation in a telephone ordering are: "dewa fukushou sasete itadakimasu (now, your order will be repeated)" as a starting phrase; and "arigatou gozaimasita (thank you)" as an ending phrase. The fixed phrases for starting and ending confirmation are determined dependent on an application field, and are not limited to the above. Moreover, in identifying (also referred to as spotting) locations where such fixed phrases are spoken, a garbage grammar (model), matching with phrases other than fixed phrases to be recognized, is often used in combination with the fixed-phrase grammar. However, a description for the garbage grammar is omitted since it is a well-known technique in the field. Alternatively, when the entire speech is a recognition target, step 210 is not executed, and the time of the speech segment are set as $(t_s, t_e)=(0, \text{end of call})$.

Steps 220 to 250 are the processing executed in the boundary extracting unit 120 for extracting boundaries (dividing position) in a speech. The boundary extracting unit 120 extracts boundary (dividing position) candidates in a speech in the following manner of: firstly, detecting pause locations in the channel which makes a main speech and detecting acknowledgement locations in the channel which does not make the main speech; and secondly, extracting pauses each existing within a certain time period before and after an acknowledgement location.

To be more precise, in step 220, the pause detecting section 122 detects pause locations in the recognition target segment in C2. This processing is equivalent to 320 in FIG. 3. The detection is performed by matching the speech with a power of the usual speech and with a silent phoneme model learned in advance. The pauses extracted here are boundary candidates, while actual boundaries are finally decided by combining each of the candidates with likelihoods obtained by matching the candidate with an acknowledgement location and with grammar. For this reason, it is desirable to give priority not to a precision but to a recall in determining the boundary. Specifically, the recall is a ratio of the number of pauses detected correctly to the number of pauses that should be detected. Meanwhile, the precision is accuracy indicating how many of extracted locations are turned out to be the actual pauses each equivalent to a boundary of a sentence or a phrase. In this embodiment, five pause candidates (p1, . . . , p5) are detected totally.

In step 230, the acknowledgement detecting section 124 detects an acknowledgement location in the recognition target segment in channel C1 which is for the respondent (listener), by matching the speech with the acknowledgement grammar. In the acknowledgement grammar, expressions of acknowledgement, for example, words and phrases such as "hai (yes)" and "ee (OK)" are registered. This processing is equivalent to 330 in FIG. 3. In this embodiment, three acknowledgements (r1, . . . , r3) are extracted.

In the processing executed in step 240 and following steps, the speech recognition is performed by dividing the recognition target segment by use of the pause locations and acknowledgement locations. This processing is equivalent to 340 in FIG. 3. Suppose that a first dividing start position is $t_s$, and that a base point is the acknowledgement location (r1) first detected when the speech is scanned from the dividing start position. Then, a pause existing within a certain range (r1−ΔTa, r1+ΔTb) around the base point is extracted as a boundary candidate for the dividing end position. Here, p1, p2 and p3 are extracted. Ta and Tb are determined in accordance with the maximum allowable time difference between the target dividing end position and an acknowledgement, and are normally set to 500 msec to 1000 msec.

In step 250, the recognizing unit 130 performs recognition on the segment between the dividing start position and each of the boundary candidates extracted in step 240. Thereafter, the recognizing unit 130 recognizes the segment with the highest likelihood as an utterance, and thereby outputs a word string. This processing is equivalent to 350 in FIG. 3. To be specific, the recognizing unit 130 recognizes each of the segments having one of the extracted boundary candidates as the dividing end position, namely, segment A, segment B and segment C, by matching them with the recognition grammar. Then, the recognizing unit 130 obtains the recognition results and calculates likelihoods thereof at the same time. These likelihoods are normalized on a time basis depending on the length of each speech segment, and are then compared with each other, so that the segment having the highest likelihood is determined to have the dividing end position. Thus, as a result of dividing the speech into the segments, the determined dividing end position is outputted from the recognizing unit together with the recognition result (word string). In this embodiment, segment B having the highest likelihood of 7.8 is determined as having the dividing end position. The recognition grammar is a collection of phrases which are supposed to appear in a speech, and which are each described in a divided speech segment as a unit. Accordingly, recognition succeeds, for example, when the following fixed patterns appear in a speech:

```
shouhin bangou ga? <NUMBER> no <PRODUCT_NAME>
   (the product code is? <NUMBER> of <PRODUCT_NAME>)
kawase hejji wa? (ari|nasi)
   (exchange hedge is ? (used|not used))
kuchisuu wa <NUMBER> kuchi
   (the number of units is <NUMBER> units)
```

One of a variety of possible likelihoods is a likelihood calculated on the basis of a probability P (X|W) that, given an outputted word string, an acoustic feature amount X is outputted from the target segment (($t_s$, p2) in this embodiment), where W denotes the word string. This value can be obtained consequently, when the recognizing unit 130 matches the string of acoustic feature amount with the acoustic model. Since many studies have been made on the aforementioned likelihoods and confidence measures in the field of speech recognition, there are various possible methods for calculating the probability value. In step 250, a determination of a divided segment based on the recognition results and likelihoods may be made by using a statistical language model instead of using the recognition grammar. In such a case, the learning for generating the language model from a written learning text is performed with a sentence start/end symbols added to each location corresponding to the acknowledgement. Hence, the generated language model is used in the recognition. In the case of using the statistical language model, the likelihood may be calculated by using a product P(W)·P(X|W) obtained by multiplying the probability P (X|W) of outputting the acoustic feature amount X, by the probability P(W) of outputting the language model.

In step 255, it is determined whether or not the processing is completed up to the end of the recognition target segment. If the processing is completed, the processing is terminated, while if not, the processing continues to step 260.

In step 260, the dividing start position is changed to the dividing end position determined in step 250, namely, the right end of segment B, denoted by p2. Then, steps 240 to 260 are repeated to the end of the recognition target segment. This processing is equivalent to 360 of FIG. 3.

Figure 4:
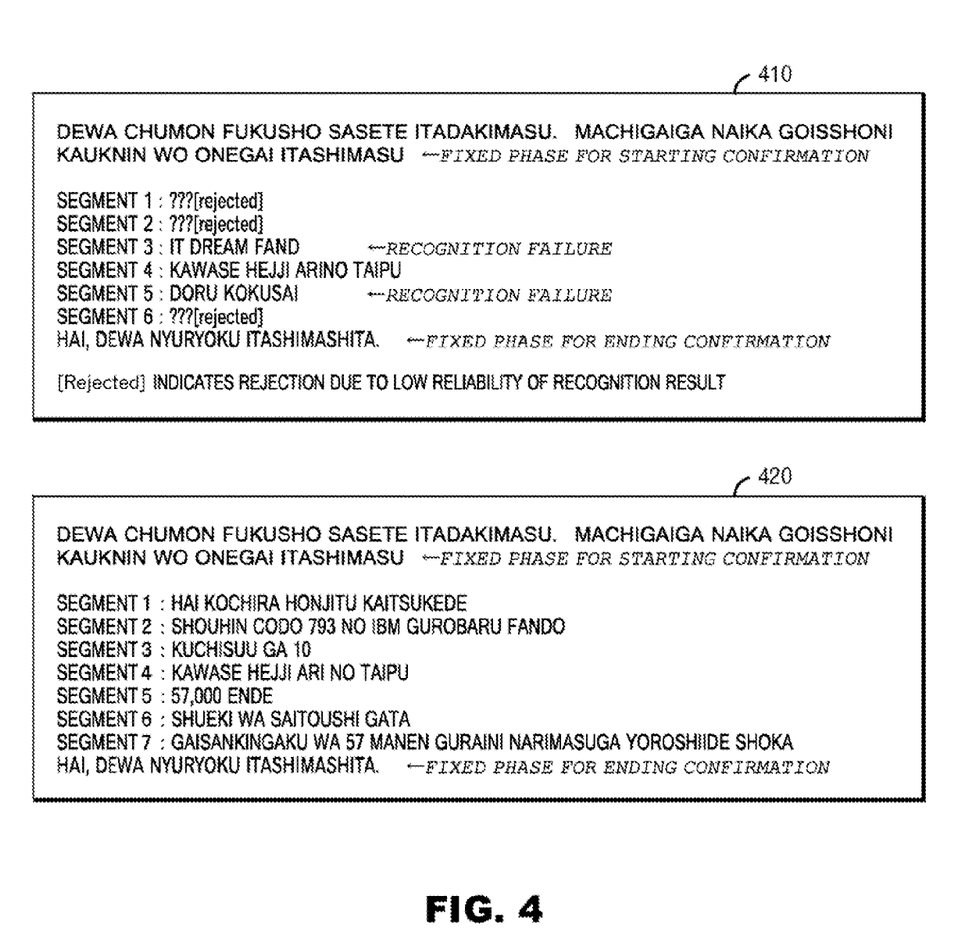
FIG. 4 is a diagram showing differences in segmentation and recognition results between a conventional technique and the embodiment of the present invention.

FIG. 4 shows a difference in segmentation and recognition results between a conventional technique and the present invention. Here, as the conventional technique, employed is a method in which the entire recognition target segment is automatically divided using only the recognition grammar while being recognized as one continuous speech. A box 410 shows the segmentation and recognition result of the conventional technique. In the box 410, the segmentation and recognition have failed in a large number of voice streams starting from "dewa chuumon fukushou sasete itadakimasu, machigaiga naika goisshoni kakunin wo onegai itasimasu (Now, your order will be repeated, and please check whether it contains any mistake)." and ending at "hai, dewa nyuuryoku itasimasita (now, your order is inputted)." On the other hand, in a box 420 showing the segmentation and recognition results according to the present invention, speech segments of the main speech are correctly divided and recognized. Incidentally, commas and periods in the above description of the voice streams are inserted only to make the descriptions understandable.

Figure 5:
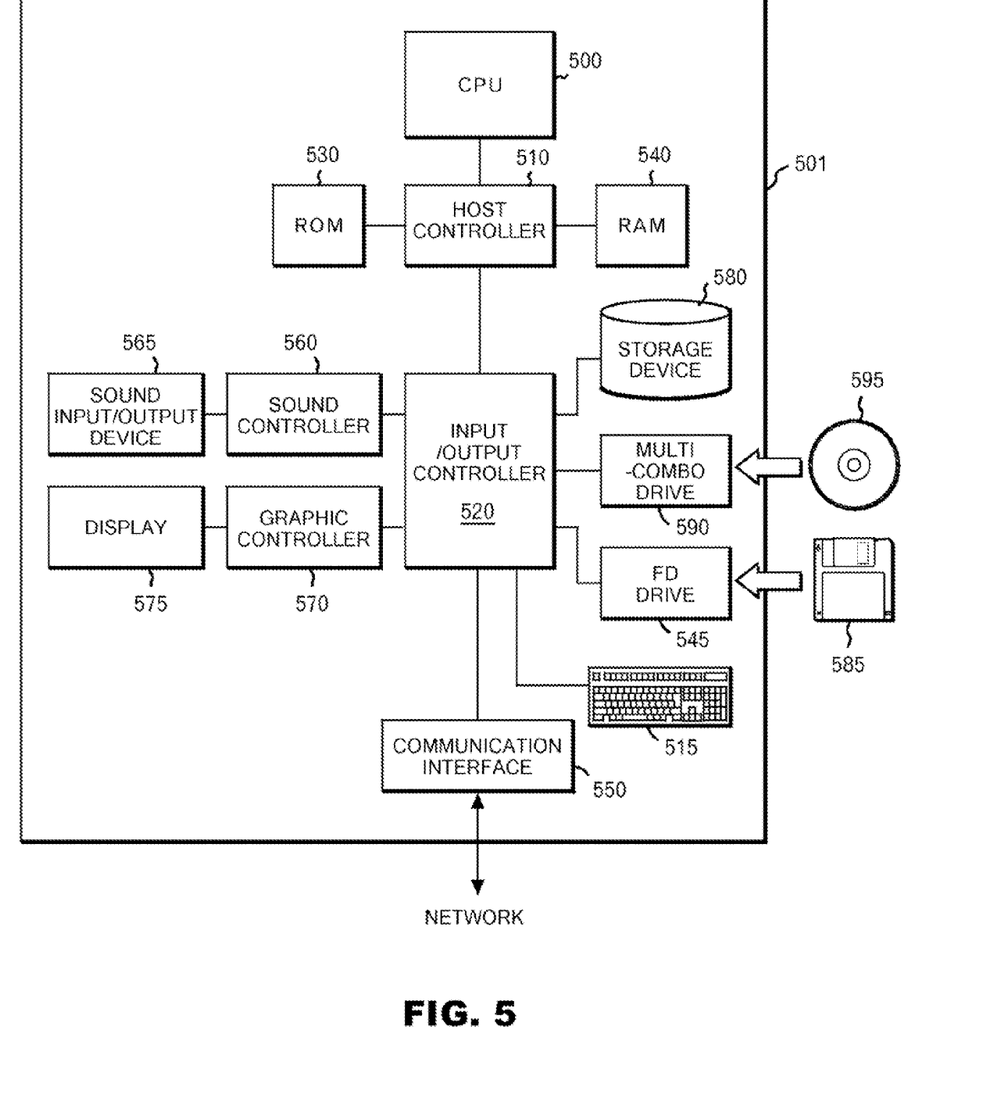
FIG. 5 shows an example of a hardware configuration capable of implementing the present invention.

Next, an example of a hardware configuration of the present invention will be explained. Needless to say, each of the blocks shown in FIG. 1 may be configured of a dedicated hardware, while the blocks can be similarly configured of a general information processing apparatus. FIG. 5 shows a hardware configuration example of an information processing apparatus that can be also used as the apparatus of the present invention. A computer 501 includes a CPU peripheral unit that contains a CPU 500, a PAM 540, a ROM 530 and an input/output controller 520 all of which are mutually connected to one another via a host controller 510. The computer 501 further includes a communication interface 550, a hard disk drive 580, a multi-combo drive 590, a flexible disk drive 545, a sound controller 560 and a graphic controller 570, all of which are connected by the input/output controller 520. Specifically, the multi-combo drive 590 is capable of reading from and writing to disk-shaped media 595 such as a CD and a DVD, the flexible disk drive 545 is capable of reading from and writing to a flexible disk 585, the sound controller 560 drives a sound input/output device 565, and the graphic controller 570 drives a display 575.

The CPU 500 operates in accordance with programs stored in the ROM 530, a BIOS and the RAM 540, and thereby controls each section. The graphic controller 570 acquires graphic data generated in a buffer inside the RAM 540, by the CPU 500 and the like, and then displays the data on the display 575. Otherwise, the graphic controller 570 may include a buffer therein to store graphic data generated by the CPU 500 and the like. To be more specific, voice streams are inputted in a plurality of channels from the sound input/ output device 565, and then are stored in the storage device 580 via the input/output controller 520. In the storage device 580, the word database 140 and the grammar database 150 are stored. Inputted and stored conversational dialogs of plural channels and these dictionaries are used to accurately divide and recognize a main speech through a computing operation by the CPU 500. This computing operation is performed by loading to the memory 540 and then executing a program for speech segmentation and recognition of the present invention. Output results of speech segmentation and a word string are displayed on the display 575.

The communication interface 550 communicates with outer communication devices via a network. The information processing apparatus 501 can also receive conversational dialogs from the outside via the communication interface 550, perform speech segmentation and recognition, and then transmit the result to an outer information processing apparatus via the communication interface 550. Incidentally, any one of wired, wireless, infrared connections and a short distance radio connection such as BLUETOOTH can be employed to build the network, and any kind of network can be used without adding any alterations in order to implement the present invention. The storage device 580 stores codes and data for a program of the present invention, an application, an OS and the like used by the computer 501. The multi-combo drive 590 reads programs or data from the media 595 such as a CD or a DVD, and thereafter the read programs and data are loaded to the PAM 540 to be used by the CPU 500. Instead, the program and dictionaries of the present invention may be provided from an external recording media.

As the external recording media, an optical recording medium such as a DVD and a PD, a magneto-optical recording medium such as an MD, a tape medium, a semiconductor memory such as an IC card can be used. Moreover, the program may be obtained via the network from a server system connected to a dedicated communication network or the Internet by using, as the recording medium, a storage device such as a hard disk or a PAM provided in the server system. As can be seen from the abovementioned configuration example, any hardware having the function of a general computer can be employed as hardware necessary for the present invention. For example, a mobile terminal, a portable terminal and home electric appliances can be used freely without any problem. It should be noted that FIG. 5 just illustrates the hardware configuration for implementing the embodiment of the present invention. Accordingly, other various configurations are possible as long as the embodiment of the present invention can be applied thereto. Each of the abovementioned exemplar components are not necessarily an essential component of the present invention.

The preferred information processing apparatus 501 of the present invention employs an operating system, which supports a graphical user interface (GUI) multi-window environment, such as Windows (R) operation system provided by Microsoft Corporation, Mac OS (R) provided by Apple Inc., and Unix (R) system including X Window System (for example, AIX (R) provided by International Business Machines Corporation). Additionally, the present invention can be achieved by employing hardware, software or a combination of hardware and software.

According to the present invention, a voice stream is divided into appropriate utterance by using information obtained by combining an acknowledgement location and a pause location. Consequently, accuracy is improved in recognition and analysis of speech.

Although the preferred embodiment of the present invention has been described in detail, it should be understood that various changes, substitutions and alternations can be made therein without departing from spirit and scope of the present inventions as defined by the appended claims.

That which is claimed is:

1. An apparatus for dividing a main speech of a first speaker in a conversational dialog comprising the first speaker and a second speaker into at least one utterance, the apparatus comprising:
a computer processor configured to execute:
a pause detecting section for detecting pauses in the main speech of the first speaker received from a first channel among at least two channels;
an acknowledgement detecting section for detecting acknowledgements in a speech of the second speaker received from a second channel of the at least two channels, wherein the second channel is separate from the first channel;
a boundary-candidate extracting section for extracting boundary candidates in the main speech of the first speaker received from the first channel based, at least in part, on identifying pauses detected by the pause detecting section that are located within a predetermined range before and/or after respective locations of the acknowledgements detected by the acknowledgement detecting section in the speech of the second speaker received from the second channel; and
a recognizing unit for outputting a word string associated with at least one utterance formed by segmenting the main speech of the first speaker received from the first channel according to at least one of the extracted boundary candidates.

2. The apparatus according to claim 1, wherein the recognizing unit is capable of accessing a word database for storing spellings and pronunciations of words and a grammar database for storing syntactic rules on words, and wherein the grammar database includes at least one of a fixed-phrase grammar, an acknowledgement grammar, and a recognition grammar.

3. The apparatus according to claim 2, wherein the processor is further configured to execute a recognition-target segment determination unit for determining a recognition target segment to be divided into one or more utterances by referring to the fixed-phrase grammar, wherein:
the fixed-phrase grammar includes fixed phrases for starting and ending a confirmation,
the word database includes spellings and pronunciations of the fixed phrases for starting and ending a confirmation.

4. A method for dividing a main speech of a first speaker in a conversational dialog comprising the first speaker and a second speaker into at least one utterance, the method comprising the steps of:
detecting pauses in the main speech of the first speaker received from a first channel of a plurality of channels;
detecting acknowledgements in a speech of the second speaker received from a second channel of the plurality of channels, wherein the second channel is separate from the first channel;
extracting boundary candidates from the main speech of the first speaker received from the first channel at least in part by identifying detected pauses that are located within a predetermined range before and after respective locations of the detected acknowledgements detected in the speech of the second speaker received from the second channel; and
outputting a word string associated with at least one utterance formed by segmenting the main speech of the first speaker received from the first channel according to at least one of the extracted boundary candidates.

5. The method according to claim 4, wherein, in the step of outputting the word string, likelihoods of speech segments divided by the boundary candidates are calculated in reference to a word database in which spellings and pronunciations of words are described and a grammar database in which syntactic rules on words is described, and wherein a word string of a speech segment having a highest likelihood is outputted after dividing the speech segment into at least one utterance.

6. The method according to claim 4, wherein the grammar database includes at least one of a fixed-phrase grammar, an acknowledgement grammar, and a recognition grammar.

7. The method according to claim 6, wherein:
the fixed-phrase grammar includes fixed phrases for starting and ending a confirmation;
the word database includes spellings and pronunciations of the fixed phrases for starting and ending a confirmation.

8. The method according to claim 6, the method further comprising determining a recognition target segment to be divided into utterance by referring to the fixed-phrase grammar.

9. A computer-readable storage device storing computer-executable instructions that, when executed by at least one processor, perform a method for dividing a main speech of a first speaker in a conversational dialog comprising the first speaker and a second speaker into at least one utterance, the method comprising:
detecting pauses in the main speech of the first speaker received from a first channel of a plurality of channels;
detecting acknowledgements in a speech of the second speaker received from a second channel of the plurality of channels, wherein the second channel is separate from the first channel;
extracting boundary candidates from the main speech of the first speaker received from the first channel at least in part by identifying detected pauses that are located within a predetermined range before and after respective locations of the detected acknowledgements detected in the speech of the second speaker received from the second channel; and
outputting a word string associated with at least one utterance formed by segmenting the main speech of the first speaker received from the first channel according to at least one of the extracted boundary candidates.

10. The computer-readable storage device according to claim 9, wherein outputting the word string comprises calculating likelihoods of speech segments divided by the boundary candidates in reference to a word database in which spellings and pronunciations of words are described and a grammar database in which syntactic rules on words is described, and wherein a word string of a speech segment having a highest likelihood is outputted after dividing the speech segment into at least one utterance.

11. The computer-readable storage device according to claim 9, wherein the grammar database includes at least one of a fixed-phrase grammar, an acknowledgement grammar, and a recognition grammar.

12. The computer-readable storage device according to claim 11, wherein:
the fixed-phrase grammar includes fixed phrases for starting and ending a confirmation; and
the word database includes spellings and pronunciations of the fixed phrases for starting and ending a confirmation.

13. The computer-readable storage device according to claim 11, the method further comprising determining a recognition target segment to be divided into utterance by referring to the fixed-phrase grammar.

* * * * *